(12) United States Patent
Welle et al.

(10) Patent No.: US 11,499,860 B2
(45) Date of Patent: Nov. 15, 2022

(54) RADAR FILL LEVEL MEASURING DEVICE

(71) Applicant: VEGA GRIESHABER KG, Wolfach (DE)

(72) Inventors: Roland Welle, Hausach (DE); Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 287 days.

(21) Appl. No.: 16/662,974

(22) Filed: Oct. 24, 2019

(65) Prior Publication Data
US 2020/0132533 A1 Apr. 30, 2020

(30) Foreign Application Priority Data

Oct. 25, 2018 (EP) ..................................... 18202595

(51) Int. Cl.
G01F 23/28 (2006.01)
G01S 7/292 (2006.01)
G01S 13/88 (2006.01)
G01F 25/20 (2022.01)
G01S 7/02 (2006.01)

(52) U.S. Cl.
CPC ............ *G01F 23/282* (2013.01); *G01F 25/20* (2022.01); *G01S 7/292* (2013.01); *G01S 13/88* (2013.01); *G01S 7/027* (2021.05)

(58) Field of Classification Search
None
See application file for complete search history.

(56) References Cited

U.S. PATENT DOCUMENTS

| 9,097,563 | B2 | 8/2015 | Tanabe |
| 9,506,798 | B2 | 11/2016 | Saltzgiver et al. |
| 2010/0101317 | A1 | 4/2010 | Ashrafzadeh et al. |
| 2016/0266240 | A1* | 9/2016 | Hughes ................... G01S 13/88 |
| 2017/0156540 | A1 | 6/2017 | Wheatley et al. |
| 2018/0238495 | A1* | 8/2018 | Armitage .................. G01F 9/00 |
| 2018/0372530 | A1 | 12/2018 | Welle et al. |

FOREIGN PATENT DOCUMENTS

| EP | 3 282 231 A1 | 2/2018 |
| EP | 3 418 699 A1 | 12/2018 |

* cited by examiner

*Primary Examiner* — Paul M. West
*Assistant Examiner* — Mark A Shabman
(74) *Attorney, Agent, or Firm* — Oblon, McClelland, Maier & Neustadt, L.L.P.

(57) ABSTRACT

A fill level measuring device for determining a fill level of a medium is provided, including a radar module configured to emit a transmission signal and to receive a received signal reflected on the medium, a controller configured to detect, based on the received signal, a measurement signal correlating with the fill level, and including a detector configured to detect a movement signal indicating a movement of the fill level measuring device and/or a position signal indicating a geographic position of the fill level measuring device. The controller includes activation circuitry configured to at least partially activate and/or deactivate the radar module depending on the movement signal and/or on the position signal detected by the detector.

15 Claims, 3 Drawing Sheets

RADAR FILL LEVEL MEASURING DEVICE

CROSS-REFERENCE TO RELATED APPLICATIONS

This application claims the benefit of the filing date of European Patent Application No. 18 202 595.7 filed on 25 Oct. 2018, the entire content of which is incorporated herein by reference.

TECHNICAL FIELD

The invention relates to a fill level measuring device for determining a fill level of a medium, the fill level measuring device operating according to the radar principle. The invention further relates to the use of such a fill level measuring device as a limit level switch to detect a limit level of the medium. The invention further relates to a method for operating such a fill level measuring device.

BACKGROUND

Conventional fill level measuring devices for determining a fill level using high-frequency electromagnetic signals, in particular radar signals, are usually operated within an industrial plant on or at fixed vessels.

The operation of radar-based fill level measuring devices is based on the emission and reception of high-frequency electromagnetic radar signals, typically in the frequency ranges between 6 GHz and 24 GHz, between 57 GHz and 64 GHz, and/or between 75 GHz and 85 GHz, but higher frequencies are also possible. The use of these frequency ranges is permitted in some countries, in particular in Europe, in the USA and in Canada, taking into account the requirements of relevant standards or legal provisions (e.g., EN 302 729 LPR standard, FCC CFR § 15.256). Such standards stipulate, inter alia, that the fill level measuring device should only be operated at a fixed location. However, operation during a movement or within a moving vessel is not permitted. Furthermore, radar-based fill level measuring devices must not be operated in a defined perimeter and/or environment around protected facilities, such as, e.g., radio astronomy stations, in order to avoid interference at the facility.

Usually, users of fill level measuring devices are informed in the instrument documentation that the standards described above must be observed, which can generally be guaranteed without difficulty in the case of immobile fill level measuring devices and/or immobile installations.

SUMMARY

According to the present disclosure, there is provided an improved fill level measuring device which can be operated safely and reliably.

This is achieved, in particular, by the subject matter of the independent patent claims, wherein further embodiments are defined in the dependent claims and the following description.

The following disclosure applies equally to the fill level measuring device, the use of the fill level measuring device as a limit level switch, and the method. Features, elements, and/or steps described below with respect to the fill level measuring device, the use thereof, or the method apply equally to the fill level measuring device, the use thereof, and the method.

A first aspect of the disclosure relates to a fill level measuring device and/or a radar fill level measuring device for determining the fill level of a medium, for example a liquid and/or a bulk material. The fill level measuring device can be configured to determine the fill level of the medium in a vessel and/or a container, for example. The fill level measuring device comprises a radar module for emitting a transmission signal and for receiving a received signal reflected by the medium. The fill level measuring device further comprises a controller configured to determine a measurement signal correlating with the fill level based on the received signal and/or based on processing the received signal. The fill level measuring device further comprises a detector arranged and/or configured to detect a movement signal indicative (and/or representative) of a movement of the fill level measuring device and/or a position signal indicative (and/or representative) of a geographic position of the fill level measuring device. The controller comprises an activation unit and/or an activation circuitry configured to actuate, at least partially activate and/or at least partially deactivate the radar module depending on the movement signal and/or the position signal detected by the detector. The activation circuitry may be configured to actuate, at least partially activate and/or deactivate the radar module based on the movement signal and/or the position signal detected by the detector.

In general, the fill level measuring device can be advantageously configured to determine the fill level of a medium in or at an immobile and/or transportable and/or mobile container. In other words, the fill level measuring device may be configured to be placed in and/or on a vessel, which may be immobile and/or portable.

The determination of the movement signal and/or the position signal by the detector and the activation and/or deactivation of at least part of the radar module may provide an advantageous means of ensuring and/or guaranteeing that legal provisions and/or standards, such as European and/or North American approval standards for radar-based fill level measuring devices, can be complied with. In particular, such standards may be met by the fill level measuring device without the need for operation and/or actuation of the fill level measuring device by an operator and/or user of the fill level measuring device. This in turn allows autonomous and/or self-sufficient operation of the fill level measuring device. The latter can in turn lead to cost savings, for example because no personnel are required for activation and/or deactivation. Overall, the present disclosure can therefore provide an improved fill level measuring device that can be operated safely and reliably, especially in compliance with legal requirements and/or standards for the operation of radar-based fill level measuring device or for the operation of sensors emitting electromagnetic radiation.

The radar module can refer to a radar circuit, a radar circuitry, a radar module, a high frequency circuit, and/or a high frequency arrangement. In particular, the radar module may comprise a high-frequency circuitry or unit for generating the transmission signal and/or for processing the received signal. The high-frequency circuitry and/or the radar module may, for example, comprise one or more amplifiers, one or more frequency mixers, one or more oscillators, for example voltage-controlled oscillators and/or push-push oscillators, and/or one or more filters, for example high-pass filters and/or low-pass filters. In particular, the high-frequency unit and/or the radar module may be configured to convert the received signal into an intermediate frequency signal by mixing it with the transmission signal.

The radar module can also comprise at least one antenna for the actual emission of the transmission signal and/or for receiving the received signal, which can refer to the part of the transmission signal reflected by the medium. For example, the radar module may comprise at least one parabolic antenna, a horn antenna, a Cassegrain antenna, and/or a patch antenna. The radar module may also comprise an antenna arrangement. For example, the fill level measuring device may be configured to adjust a directional feature and/or directional characteristics of the antenna arrangement, based on beam shaping technology, for example, to bundle the transmission signal.

The controller can, for example, refer to a control circuit, a control unit, an evaluator or evaluation unit, and/or an evaluation circuit which can, for example, comprise one or more logic components and/or processors. The controller may also comprise one or more analog-to-digital converters, for example, to convert the received signal and/or an intermediate frequency signal generated based thereon into a digital signal. In the context of this disclosure, e.g., the measurement signal may be such a digital signal.

The activation circuitry of the controller can refer to an activator, an activation circuit, an activation unit, and/or an activation module. For example, the activation circuitry may be coupled to the detector for processing the movement signal and/or position signal. In general, the activation circuitry can designate a part and/or component of the controller. Alternatively or additionally, the activation circuitry can be integrated in the controller.

The activation circuitry may be generally configured to operate the radar module based on the movement signal and/or the position signal. Similarly, in the context of this disclosure, "activating and/or deactivating the radar module" may mean "actuating the radar module".

Activating the radar module can mean that a fill level measurement can be performed and/or enabled. For example, when the radar module is activated, the controller and/or the activation circuitry may be configured to activate and/or increase the electrical power supplied to at least part of the radar module, such as the high frequency circuitry and/or the antenna. For example, the current and/or voltage can be increased from a first value to a second value. The first value can be zero (about zero amperes and/or zero volts) or a value other than zero. Accordingly, activating at least part of the radar module can comprise switching on and/or turning on. Alternatively or additionally the activation of the radar module can mean that a measurement of the fill level and/or a transmission of the transmission signal is enabled, allowed and/or released.

Deactivating the radar module may mean that no fill level measurement can be performed. For example, if the radar module is deactivated, the controller and/or the activation circuitry may be configured to deactivate and/or reduce the electrical power supplied to at least part of the radar module, such as the high frequency unit and/or the antenna. For example, the current and/or voltage can be reduced from a second value to a first value. The first value may be zero (about zero amperes and/or zero volts) or different from zero. Accordingly, the deactivation of at least part of the radar module can mean a shutdown, so that a measurement of the fill level and/or an emission of the transmission signal is prevented. Alternatively or additionally, deactivating the radar module can mean that a measurement of the fill level and/or an emission of the transmission signal is suppressed and/or prevented.

In the context of the present disclosure, the detector may refer to a detection circuit, a detection arrangement, a sensor circuit, a sensor arrangement, a motion detector, a position determination unit, and/or a motion detection and position determination unit. For determining the movement signal and/or the position signal, the detector may comprise at least one sensor, the at least one sensor being for example an acoustic, optical and/or radar-based Doppler sensor, an acceleration sensor, a gyro sensor, a vibration sensor, an geomagnetic field sensor, and/or a position sensor.

For example, the detector may be designed to detect, determine and/or recognize whether the fill level measuring device is immobile (or static) at a location or in motion. The detector may comprise one or more sensors that directly indicate a movement of the fill level measuring device, such as an acoustic, optical and/or radar Doppler sensor, an acceleration sensor, a vibration sensor, and/or an geomagnetic field sensor. Alternatively or additionally, the detector may comprise at least one sensor and/or position sensor and/or be configured to detect a movement of the fill level measuring device by determining, e.g., continuously, a current position of the fill level measuring device and by comparing it with at least one position of the fill level measuring device determined temporally in advance. For this purpose, the detector can, for example, be configured to determine, by evaluating navigation signals and/or signals from satellites, for example, GPS, GLONASS, GALILEO, and/or by evaluating position data provided by a wireless network (for example, mobile radio, LAN, LoRa, Sigfox, NB-IoT) (for example, via a communication circuitry of the fill level measuring device), whether the fill level measuring device remains at a stationary location or whether it is moved. In other words, the detector may be configured to use information from a communication circuitry of the fill level measuring device, in particular position data, which can be transmitted to the fill level measuring device via and/or from a wireless network.

The movement signal can generally denote a signal that indicates, represents and/or describes a movement of the fill level measuring device. For example, the movement signal may be a binary signal where a first value (or movement value) of the movement signal may indicate that the fill level measuring device is immobile (or at a stationary location) and another movement value of the movement signal may indicate that the fill level measuring device is in movement. However, the movement signal may not be binary. For example, the movement signal may also be indicative, descriptive and/or representative of a movement value of the fill level measuring device, wherein the movement value and/or the movement signal may correlate with a movement of the fill level measuring device, with a speed at which the fill level measuring device is moved, and/or with a distance over which the fill level measurement device is moved.

The position signal can generally refer to a signal containing information relating to a geographic position of the fill level measuring device. The geographic position of the fill level measuring device can also be derived from the position signal. The position signal can indicate, represent, describe, and/or encode a geographic position of the fill level measuring device. For example, the position signal may contain position data related to the geographic position of the fill level measuring device. It should also be noted that the movement signal may include the position signal and vice versa.

The movement signal and/or position signal detected by the detector can be transmitted from the detector to the controller and/or the activation circuitry. Within the controller, the activation circuitry can analyse and/or process the movement signal and/or the position signal. The activation circuitry and/or the controller may also be configured to ensure that the radar module, the high frequency circuitry, and/or the antenna are deactivated during movement of the fill level measuring device, thus preventing transmission of the transmission signal. The controller and/or the activation circuitry may also be configured to enable/allow fill level measurement and/or transmission of the transmission signal by activating the radar module, such as the high-frequency circuitry and/or the antenna. In this way, it can be ensured that the fill level measuring device can safely comply with the requirements of legal regulations and/or standards under all conceivable circumstances, especially on mobile vessels or containers.

According to an embodiment, the activation circuitry of the controller is configured to operate, in particular activate and/or deactivate, the radar module based on the movement signal and/or position signal, in such a way that the radar module transmits the transmission signal only while the fill level measuring device is immobile, static and/or at a static location. This may mean that the fill level measuring device is not in movement, is motionless, is not being moved and/or is in a stationary location (or stationary position). This can ensure that no measurement can be made while the fill level measuring device is in motion.

According to an embodiment, the activation circuitry is configured to determine, based on the movement signal and/or the position signal, whether the fill level measuring device is located in the perimeter, in a zone, in an area, and/or in an environment of a protected facility, in particular in the vicinity of a radio astronomy station, wherein the activation circuitry is configured to at least partially deactivate the radar module when the fill level measuring device is located in the perimeter, in the vicinity, in a zone, in an area, and/or in an environment of the protected facility. The perimeter around the protected facility may designate any geographic area within which the protected facility is located. The perimeter may be defined by geographic coordinates and/or position data of the protected facility. It should be noted that, in the context of this disclosure, the perimeter is not limited to a circular perimeter, but may designate an environment of any geometry.

Depending on the country in which the fill level measuring device is operated, an environment may be defined by the respective national approval requirements. The fill level measuring device can be configured to automatically determine the country in which it is operated, for example by using the detector, a position sensor, a position determination unit and/or in the memory. The fill level measuring device may also be configured to determine and/or use, depending on the country of operation, the valid definitions to be applied under national law for the definition of a perimeter of the protected facility. Such definitions may, for example, be stored in a memory and/or a non-volatile memory area of the fill level measuring device.

In particular, the disclosure can be considered to be based on the findings described below. It may be intended to determine the fill level of a medium in/at a mobile and/or transportable vessel/container, i.e., a vessel/container which can be moved. Such vessels or containers may, for example, be so-called intermediate bulk containers or any other movable containers, such as a tanks (such as a container) on a train, a tanks (such as a container) on a ship or a tanks (such as a container) on a transport vehicle. The fill level measuring device can be attached, fastened and/or mounted to the container on the outside or inside of the container, for example. Such containers can be moved at regular intervals, for example to transport a product and/or medium from a supplier to a customer. With conventional fill level measuring devices it cannot be guaranteed that they will not carry out a measurement while the mobile vessel (and thus the fill level measuring device itself) is being transported. This can be especially the case with hermetically sealed fill level measuring devices which are battery operated. Even driving through the perimeter of a protected facility, such as a radio astronomy station, cannot be foreseen and/or detected with conventional fill level measuring devices. A rule-compliant operation of such conventional fill level measuring devices, especially on mobile vessels, is therefore hardly possible.

In contrast to conventional fill level measuring devices, the fill level measuring device according to the disclosure, can be configured to detect whether the fill level measuring device is being moved and/or whether it is within a perimeter of a protected facility. If this is the case, the controller and/or the activation circuitry can deactivate at least part of the radar module so that no transmission signal is emitted while the fill level measuring device is moving and/or while the fill level measuring device is in the vicinity of the protected facility. Furthermore, no personnel may be required to deactivate the radar module so that the fill level measuring device can be operated reliably, safely, autonomously, and self-sufficiently in compliance with legal requirements and/or standards. This also makes it considerably easier to obtain approval for the fill level measuring device from government authorities.

The fill level measuring device and/or the radar module can, for example, be configured to emit a transmission signal with a transmission frequency of at least 6 GHz. The transmission frequency of the transmission signal can, for example, be in the frequency ranges between 6 GHz and 24 GHz, between 57 GHz and 64 GHz, and/or between 75 GHz and 85 GHz. Alternatively or additionally, the radar module can be designed as a V-band radar module, an E-band radar module, a W-band radar module, and/or an F-band radar module. In other words, the transmission frequency of the transmission signal may be between 60 GHz and 75 GHz (V-band), between 60 GHz and 90 GHz (E-band), between 75 GHz and 110 GHz (W-band), and/or between 90 GHz and 140 GHz (F-band).

By providing the detector for determining the movement signal and/or the position signal and by providing the activation circuitry, it can be ensured that the fill level measuring device only emits high-frequency radar signals, such as the transmission signal with a frequency of, e.g., 6 GHz or higher, if the fill level measuring device remains at a fixed location. In addition, it can be ensured that the fill level measuring device does not emit high-frequency radar signals with a frequency of, e.g., 6 GHz or higher if it is located in the perimeter of a protected facility, such as a radio astronomy station.

According to an embodiment, the position signal represents a current geographic position of the fill level measuring device and/or the position signal correlates with a current position of the fill level measuring device, wherein the activation circuitry is configured to determine whether the fill level measuring device is within the perimeter of the protected facility based on a comparison of the current position of the fill level measuring device with position data indicating and/or defining the perimeter of the protected facility. If the activation circuitry determines, based on the comparison, that the fill level measuring device is within the perimeter, the radar module can be at least partially deactivated.

According to an embodiment, the position data defining the perimeter of the protected facility is stored in a memory, a memory device and/or in a data memory of the fill level measuring device. Alternatively or additionally, the fill level measuring device is configured to retrieve the position data defining the perimeter of the protected facility via a remote inquiry and/or request, e.g., via a communication circuitry of the fill level measuring device. This may ensure that the fill level measuring device can be deactivated in the vicinity of any facility. The position data of the protected devices can also be easily updated and/or adapted.

The memory of the fill level measuring device may also contain software instructions which, when executed, for example, by a processor of the fill level measuring device, cause the fill level measuring device, the detector, the activation circuitry, and/or the controller to perform and/or execute one or more functions of the fill level measuring device according to the disclosure.

In accordance with an embodiment, the detector comprises at least one sensor for determining the movement signal and/or the position signal, wherein the at least one sensor is selected from the group consisting of Doppler sensor, acceleration sensor, gyro sensor, vibration sensor, geomagnetic field sensor, and position sensor. Any other sensors, such as optical sensors and/or a camera, can also be used to determine the movement signal and/or the position signal.

According to an embodiment, the detector is configured to detect a first position signal at a first time instant and a second position signal at a second time instant different from the first time instant, the detector being configured to detect and/or determine the movement signal based on a comparison of the first position signal and the second position signal. The first position signal may approximately represent and/or include a first position of the fill level measuring device and the second position signal may represent and/or include a second position of the fill level measuring device. If the first position differs from the second position, the detector can reliably determine whether the fill level measuring device is moving or immobile based on the comparison. The comparison of the first and second position signals can, for example, include a difference between the first position and the second position. More than two position signals can also be used to determine the movement signal.

According to an embodiment, the fill level measuring device also comprises a communication circuitry configured to transmit the measurement signal and/or a measurement value correlating with the measurement signal to a receiver wirelessly and/or via a wireless network. The wireless network can be, for example, a mobile network, the Internet, a LAN network, a WLAN network, a LoRa network, a Sigfox network, and/or a NB-IoT network. For this purpose, the fill level measuring device and/or the communication circuitry may comprise at least one WLAN module, BLUETOOTH® module, radio module, mobile radio module, and/or one infrared module.

According to an embodiment, the detector is coupled to the communication circuitry, the detector being configured to detect the movement signal and/or the position signal based on position data received via the communication circuitry, for example, indicating the position of the fill level measuring device. Such position data may be provided to the fill level measuring device, for example, via a wireless network to which the communication circuitry and/or the fill level measuring device is connected.

According to an embodiment, the detector is at least partially integrated in the controller. In other words, the detector can be part of the controller. This may allow the fill level measuring device to be compact and space saving.

According to an embodiment, the radar module comprises a high-frequency circuitry for generating the transmission signal and an antenna for radiating and/or emitting the transmission signal and receiving the received signal, wherein the activation circuitry is configured to operate, actuate, activate, and/or deactivate the high-frequency circuitry and/or the antenna depending on the movement signal and/or position signal detected by the detector.

According to an embodiment, the fill level measuring device further comprises a housing which completely and/or permanently encloses the radar module, the controller and the detector. Alternatively or additionally, the fill level measuring device is completely cable-free and/or cordless to the outside. In other words, the housing may not have any cable bushings. In particular, the housing may completely enclose other components of the fill level measuring device, such as the communication circuitry, the antenna, the high frequency circuitry, and/or a power supply circuitry. In particular, the housing may be designed in such a way that it cannot be opened. This prevents, for example, aggressive gases or liquids from coming into contact with components of the fill level measuring device as a result of unintentional opening of the housing. The housing, which permanently encloses the sensor circuitry and evaluation circuitry, can thus increase the safety and robustness of the radar sensor. The housing can also enclose the radar module, controller, detector and/or other components hermetically, airtight, dustproof, and/or waterproof.

The fill level measuring device and/or radar module may be configured to transmit the transmission signal through the housing and/or through a wall of the housing. Alternatively or additionally, the fill level measuring device and/or radar module may be configured to receive the received signal through the housing and/or through a wall of the housing.

Further, the fill level measuring device and/or communication circuitry may be configured to wirelessly transmit the measurement signal and/or a measurement value correlating with the measurement signal through the housing to a receiver and/or receiving device. The fill level measuring device can also receive and/or transmit further data, such as parameter data and/or a firmware, through the housing.

Furthermore, the fill level measuring device can be designed to be attached on the outside and/or inside of a vessel/container. For this purpose, for example, an adhesive surface can be provided on the outside of the housing of the fill level measuring device with which the fill level measuring device can be reliably, cost-effectively and easily attached and/or mounted to the vessel.

According to an embodiment, the fill level measuring device also comprises a power supply circuitry arranged in a housing of the fill level measuring device and configured to supply the radar module, the controller and the detector with electrical energy. The power supply circuitry can also supply electrical power to other components such as the communication circuitry. The power supply circuitry can comprise at least one battery for this purpose, wherein the battery can be replaceable or non-replaceable. This can provide for an autonomous fill level measuring device.

According to another embodiment, the power supply circuitry comprises an accumulator. The power supply circuitry may also comprise a charging circuitry for charging the accumulator.

By recharging the accumulator through the charging circuitry, the operating time of the fill level measuring device can be extended.

The power supply circuitry may also comprise a device or circuitry for determining the state of charge of the accumulator and/or the battery. The fill level measuring device may be configured to repeat and/or perform the measurement of the fill level and/or a limit fill level in the vessel/container at specified/predetermined intervals, the intervals being dependent on the state of charge of the accumulator and/or battery. For example, measurements may be carried out less frequently within a certain period of time if the state of charge is low compared to when the state of charge is high.

According to an embodiment, the fill level measuring device comprises a switch which can be actuated by a user and/or operator, for example manually, to deactivate the radar module, the antenna, the high frequency circuitry, and/or the fill level measuring device, in particular before the start of a transport and/or before the fill level measuring device enters (or approaches) the perimeter of a protected facility. The switch can also be used to activate the radar module, the antenna, the high frequency circuitry, and/or the fill level measuring device, for example by actuating the switch again when the transport of the fill level measuring device has been completed and/or when the fill level measuring device is outside the perimeter of the protected facility, for example after the fill level measuring device has left the perimeter of the protected facility.

A further aspect relates to the use of a fill level measuring device, as described above and below, as a limit level switch for determining a limit level of a medium.

A further aspect relates to a method for operating a fill level measuring device, as described above and below. The method comprises the following steps:

determining, with a detector of the fill level measuring device, a movement signal indicating a movement of the fill level measuring device and/or a position signal indicating a geographic position of the fill level measuring device; and activating and/or deactivating, with a controller of the fill level measuring device, at least part of a radar module of the fill level measuring device depending on the detected movement signal and/or on the detected position signal.

Features, elements and/or functions of the fill level measuring device, as described above and below, may be features, elements, and/or steps of the method for operating the fill level measuring device, as described above and below, and vice versa.

According to another aspect, a program element is provided which, when executed on a processor of the fill level measuring device and/or controller, instructs the fill level measuring device to perform steps of the method as described above and below.

According to another aspect, a (non-transitory) computer-readable medium is provided on which a program element is stored which, when executed on a processor of the fill level measuring device and/or controller, instructs the fill level measuring device to perform steps of the method as described above and below.

In the following, exemplary embodiments of the disclosure are described with reference to the figures.

BRIEF DESCRIPTION OF THE DRAWINGS

Similar or identical elements in the figures are provided with similar or identical reference signs. The figures are only schematic and not true to scale.

DETAILED DESCRIPTION OF EMBODIMENTS

Figure 1:
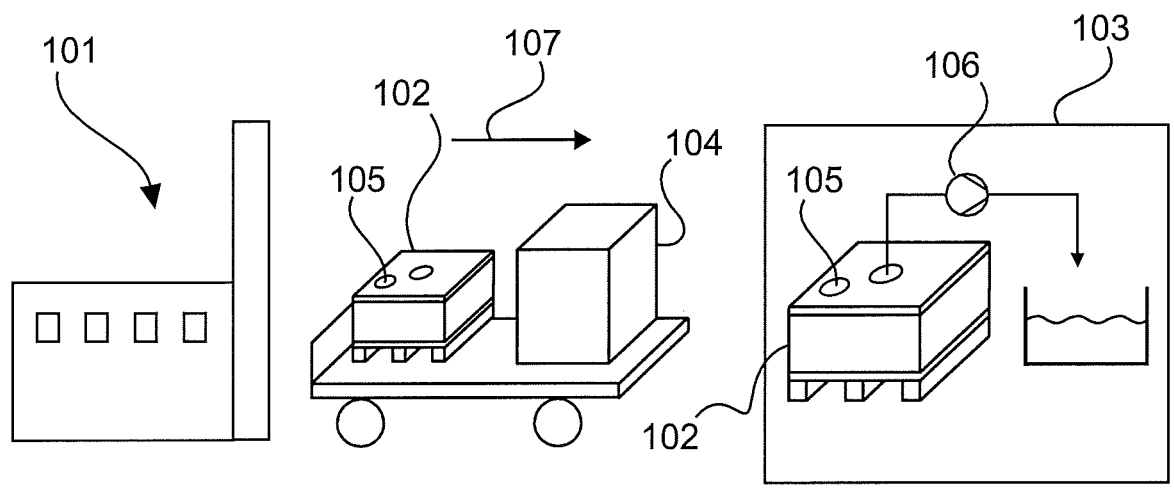
FIG. 1 schematically illustrates an application example of a fill level measuring device according to an exemplary embodiment.

FIG. 1 schematically illustrates an exemplary embodiment of a fill level measuring device 105.

Within the framework of a normal customer-supplier relationship, a first industrial company 101 can manufacture a product and/or medium transported to a customer 103 by means of a transportable vessel 102 or container 102. The medium can be transported in various vessels, such as tanks, containers, drums, tippers, and/or troughs. Due to the efficient use of the transport volume on trucks 104, ships and/or railway wagons, intermediate bulk containers are often used for liquid, fluid, and/or free-flowing media.

A fill level measuring device 105 specially designed for mobile use can be permanently coupled to the transportable container 102 and can be used by both the supplier 101 and the customer 103 to determine the fill level of the medium within the container 102.

The supplier 101 can first fill the container 102 with the medium. After the container 102 has been delivered from the transport vehicle 104 to the customer 103, the customer 103 empties the container 102, for example with the help of a pump 106. After emptying the container 102, it is usually transported back to the supplier 101, whereupon a new filling of the container 102 becomes possible.

The fill level measuring device 105 used on the mobile container 102 can in principle be wired to a higher-level power supply and a control device via a standardized interface both at the supplier 101 and at the customer 103. Alternatively, the fill level measuring device 105 can also be operated autonomously, for example via a power supply circuitry with a battery, as described above and in more detail below.

At this point it should be emphasized that the application example in FIG. 1 with the mobile container 102 is only an example. Alternatively, the fill level measuring device 105 can also be mounted on an immobile vessel. In particular, the fill level measuring device 105 of FIG. 1 can be designed as one of the fill level measuring devices 105 described in the following figures.

Figure 2:
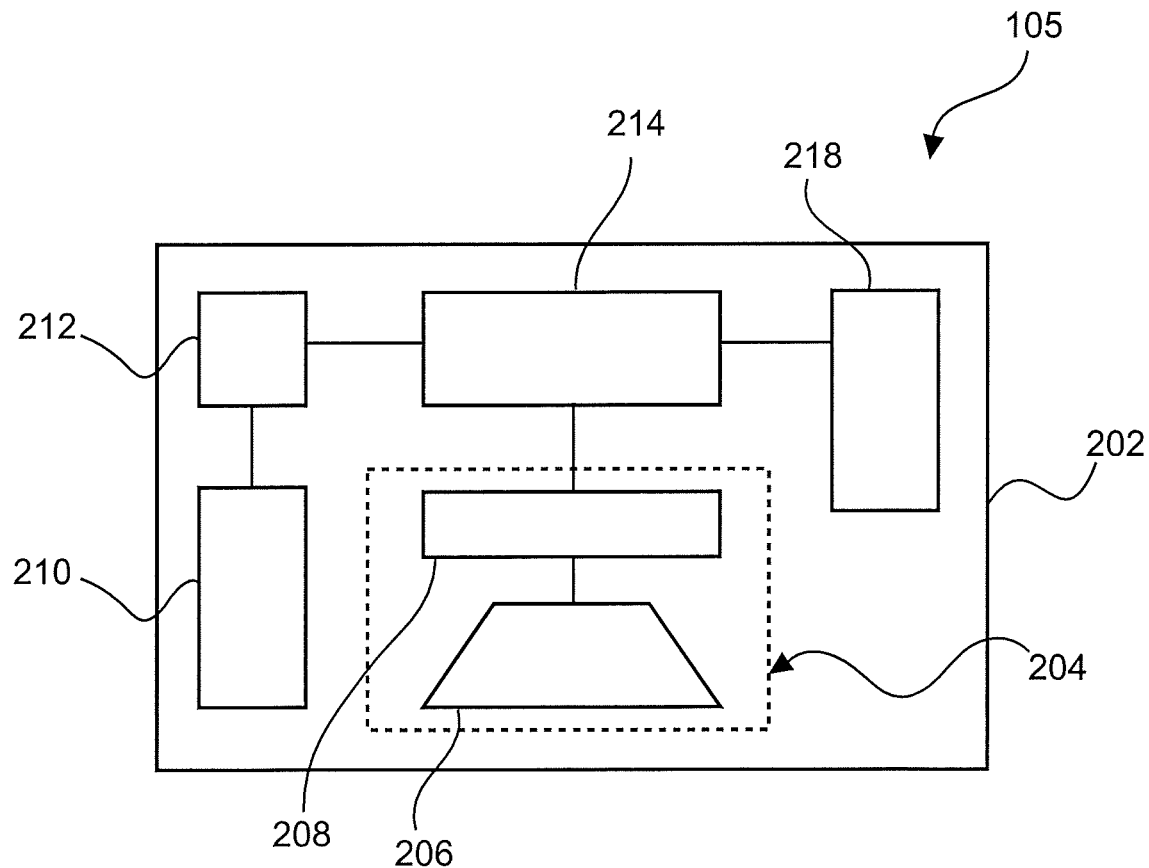
FIG. 2 schematically shows a fill level measuring device according to an exemplary embodiment.

FIG. 2 schematically shows a fill level measuring device 105 according to an exemplary embodiment.

For protection against environmental influences, the entire fill level measuring device 105 is preferably enclosed in a hermetic sleeve 202 and/or a housing 202.

The fill level measuring device 105 further comprises a radar module 204 with an antenna 206 and a high-frequency circuitry 208. The radar module 204 is integrated and/or incorporated inside the housing 202.

The fill level measuring device 105 further comprises a power supply circuitry 210 and optionally a power device 212, which can also be integrated in the housing 202.

The fill level measuring device further comprises a controller 214 as well as a communication circuitry 218, which are also integrated in the housing 202.

The power supply circuitry 210 can, for example, comprise a battery 210 which can, e.g., continuously supply the power device 212 with power, which in turn can supply the other components of the fill level measuring device 105 with suitable supply voltages and/or electrical energy.

For example, the controller 214 can perform a fill level measurement at regular, pre-settable and/or pre-programmed intervals (e.g., before commissioning). For this purpose, the controller 214 can control the radar module 204 and/or the high-frequency circuitry 208, which then emits a transmission signal (in particular a high-frequency transmission signal) over 6 GHz in the direction of a medium via the antenna 206, and receives the reflections of the same as a received signal again. The received signal can be processed by the high-frequency circuitry 208, for example, in the context of a pulse-run-time method, a Frequency Modulated Continuous Wave method (FMCW), a Stepped Frequency Continuous Wave method (SFCW), or another method. The received signal can then be converted into an intermediate frequency signal into a low-frequency range and further processed by the controller 214. The controller 214 can generate a measurement signal correlating with the fill level.

The controller 214 is further configured to determine a reflection (e.g., a reflection peak) of the medium and/or the fill level, for example, by means of an echo curve. From the position of this reflection, it is possible to determine the distance to the medium and thus the fill level inside a vessel 102.

Since the fill level measuring device 105 preferably comprises a hermetically sealed housing 202, the determined fill level value and/or a measured value can preferably be made available to a higher-level controller in wireless form via the communication circuitry 218. Different standards can be used within the communication circuitry 218, for example WLAN, BLUETOOTH®, ZIGBEE®, LoRa, Sigfox, NB-IoT.

In the application example shown in FIG. 1, it may happen that the fill level measuring device 105 is in principle able to determine one or more measured values even during a journey at a nonzero speed 107, by emitting one or more transmission signals, for example at a frequency of 6 GHz or higher. Under certain circumstances, this may make it more difficult to operate the system in accordance with the regulations in Europe, the USA, and/or Canada. Furthermore, due to different routes of the truck 104, ship, and/or goods wagons, it cannot be guaranteed that no transmission signals will be transmitted by the fill level measuring device 105 when passing through a zone, a perimeter, and/or an environment around a protected facility (e.g., radio astronomy station). The fill level measuring device 105 can therefore be designed as described in detail in the figures below to at least partially overcome these drawbacks.

Figure 3:
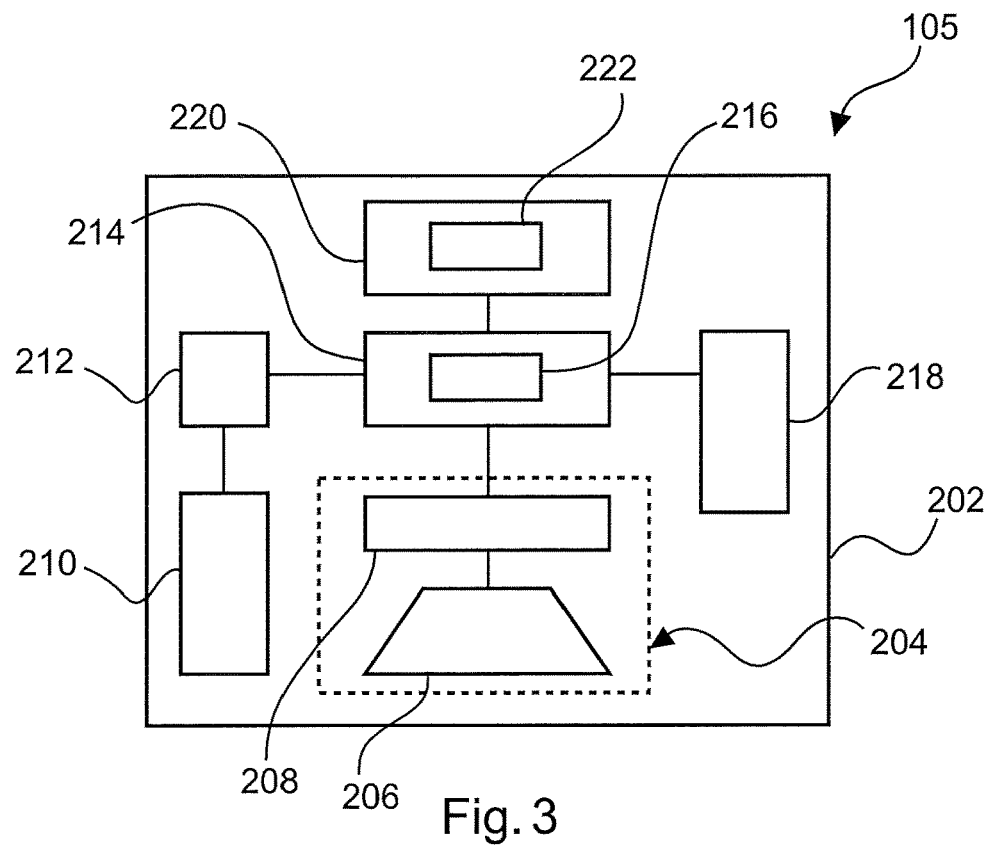
FIG. 3 schematically shows a fill level measuring device according to an exemplary embodiment.

FIG. 3 shows a fill level measuring device 105 according to an example. Unless otherwise described, the fill level measuring device 105 of FIG. 3 comprises the same elements and features as the fill level measuring devices 105 described with reference to the preceding figures.

In addition to the components described in the preceding figures, the fill level measuring device 105 comprises a detector 220. The detector 220 can for example be a movement detector 220. The controller 214 further comprises an activation circuitry 216. The controller 214 of FIG. 3 can designate a modified controller and evaluation circuitry 214 with integrated activation circuitry 216.

The detector 220 is configured to detect whether the fill level measuring device 105 is immobile or in motion. In particular, the detector 220 is configured to detect a movement signal indicating, representing, and/or describing a movement of the fill level measuring device 105 and/or a position signal indicating, displaying, representing, and/or describing a geographic position of the fill level measuring device 105.

For this purpose, the detector 220 may comprise one or more sensors 222 which can immediately determine, indicate, represent, and/or detect a movement. For example, the detector 220 may comprise one or more Doppler sensors, one or more acceleration sensors, one or more vibration sensors, and/or one or more geomagnetic field sensors. Based on one or more sensor signals of the at least one sensor 222, the detector 220 can detect the movement signal and/or the position signal. Alternatively or additionally, the detector 220 can comprise one or more sensors 222 for determining the movement signal and/or the position signal, which, for example, detect a movement of the fill level measuring device 105 by (e.g., continuously) determining the current position of the fill level measuring device 105 and by comparison with a previously determined position, for example by evaluating navigation signals and/or signals from satellites (such as GPS, GLONASS, GALILEO). In other words, the fill level measuring device 105 and/or the detector 220 may comprise one or more position sensors 222 and be configured to detect the movement signal and/or the position signal.

Alternatively or additionally, the detector 220 can detect the movement signal and/or the position signal by evaluating position data provided by a wireless network (such as mobile radio, LAN, LoRa, Sigfox, NB-IoT) via the communication unit 218. It may therefore be provided that the detector 220 uses information and/or data of the communication circuitry 218, in particular position data, disclosed by a wireless network of the communication circuitry 218, to determine the movement signal and/or the position signal.

The movement signal (or a movement value) and/or the position signal detected by the detector 220 is transmitted by the detector 220 to the controller 214 and/or the activation circuitry 216. The controller 214 and/or the activation circuitry 216 can be coupled to the detector 220 for this purpose. The activation circuitry 216 is thereby configured to at least partially actuate, activate, and/or deactivate the radar module 204 depending on the movement signal and/or position signal detected by the detector 220. In other words, the movement signal and/or the position signal can be processed and/or analyzed by the controller 214 and/or the activation circuitry 216. The activation circuitry 216 can deactivate the radar module 204, the high-frequency unit 208, and/or the antenna 206 upon detection of a movement of the fill level measuring device 105, so that no transmission of a transmission signal and/or a high-frequency signal occurs during a movement of the fill level measuring device 105.

Furthermore, the controller 214 and/or the activation circuitry 216 is configured to detect, based on the movement signal and/or the position signal, an immobilization of the fill level measuring device 105, and/or a stationary state of the fill level measuring device 105 at a steady location and to activate the radar module 204, the antenna 206, and/or the high-frequency circuitry 208 so that a fill level measurement is enabled and/or can be performed.

In this way, it can be ensured that the fill level measuring device 105 can also comply with the requirements of legal regulations and/or standards, especially on movable vessels 102.

Figure 4:
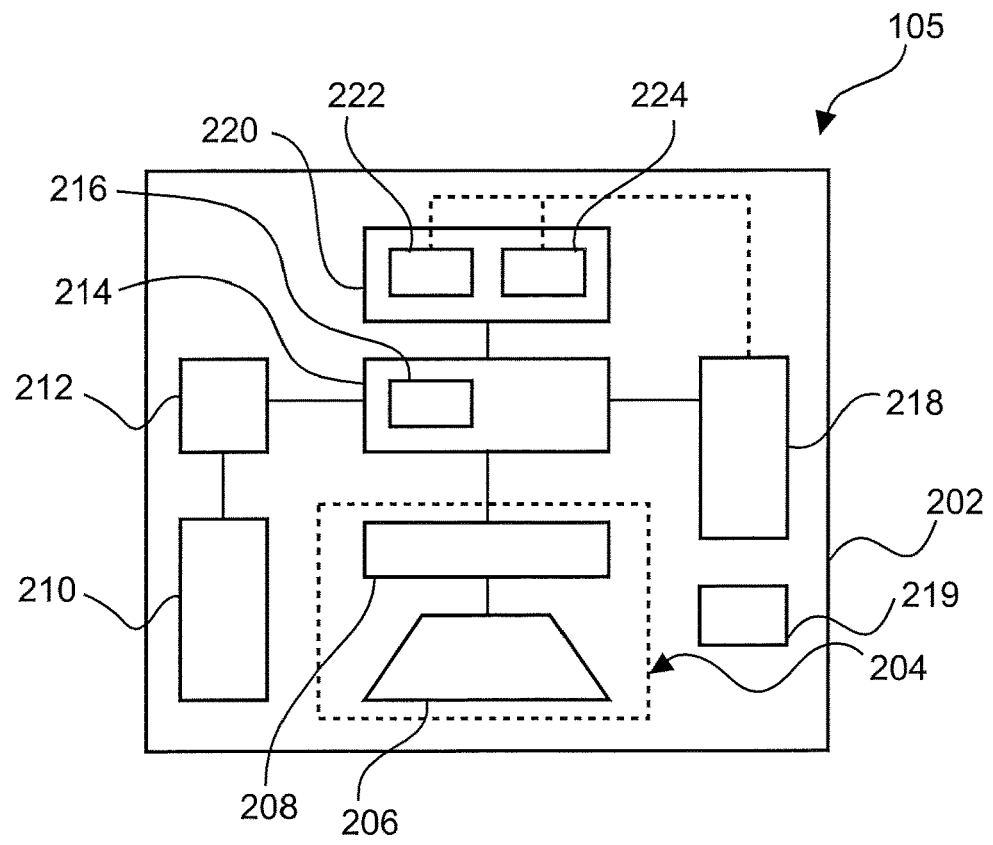
FIG. 4 schematically shows a fill level measuring device according to an exemplary embodiment.

FIG. 4 shows a fill level measuring device 105 according to another example. Unless otherwise described, the fill level measuring device 105 of FIG. 4 comprises the same elements and features as the fill level measuring devices 105 described with reference to the preceding figures.

The fill level measuring device 105 comprises a detector 220 with a sensor 222, such as a movement sensor 222, a Doppler sensor 22, a position sensor 224, and/or a position determination unit 224. The activation circuitry 216 of the controller 214 can be adapted, modified, and/or configured to process signals from the movement sensor 222 and the position sensor 224.

The activation circuitry 216 can be a motion-sensitive and/or position-sensitive activation circuitry 216. The activation circuitry 216 is configured to process, analyze, and/or evaluate one or more position signals, position data, and/or position values of the position sensor 224.

The detector 220 is configured to detect the movement signal based on the at least one movement sensor 222, as explained above with reference to FIG. 3. Alternatively or additionally, the detector 220 is configured to detected, based on the position sensor 224, a geographic position of the fill level measuring device 105 and/or the position signal which can represent the geographic position, for example continuously, continually, and/or at predetermined times. For this purpose, the detector 220 and/or the position sensor 224 can, for example, evaluate and/or process signals and/or navigation signals from satellites (such as GPS, GLONASS, GALILEO) in order to determine, generate, and/or detect the position signal based on these signals. Alternatively or additionally, the detector 220 and/or the position sensor 224 can determine the position signal and/or the geographic position of the fill level measuring device 105 by evaluating position data provided by a wireless network (e.g., mobile radio, LAN, LoRa, Sigfox, NB-IoT).

The movement signal and/or the position signal can then be provided to the controller 214 and/or the activation circuitry 216. The activation circuitry 216 is configured to check and/or determine whether the current position of the fill level measuring device 105 falls within a perimeter of a protected facility based on the position signal (and/or the movement signal). For this purpose, geographic positions and/or perimeter definitions of one or more protected facilities may be stored in a memory 219 of the fill level measuring device 105 and/or a database 219 in the fill level measuring device 105. Alternatively or additionally it may be provided to check the current position of the fill level measuring device 105, e.g., on the Internet, for the presence of a protected facility in the vicinity of the fill level measuring device 105 using the communication device 218. In the event that the fill level measuring device 105 is located in the vicinity of a protected facility (e.g., a radio astronomy station), the controller 214 and/or the activation circuitry 216 ensures that the radar module 204, the antenna 206, and/or the high-frequency circuitry 208 is deactivated and that therefore no transmission signal and/or high-frequency signal is emitted.

Figure 5:
FIG. 5 shows a flowchart to illustrate steps of a method for operating a fill level measuring device according to an exemplary embodiment.

FIG. 5 shows a flowchart illustrating steps of a method to operate a fill level measuring device 105 according to an example. The fill level measuring device 105 may be one of the fill level measuring devices 105 described with reference to the preceding figures.

Step S1 includes determining, with a detector 220 of the fill level measuring device 105, a movement signal indicating a motion of the fill level measuring device 105 and/or a position signal indicating a geographic position of the fill level measuring device 105.

Step S2 includes actuating, activating and/or deactivating, with a controller 214 and/or an activation unit 216 of the fill level measuring device 105, at least part of a radar module 204 of the fill level measuring device 105 depending on the determined movement signal and/or on the determined position signal.

Figure 6:
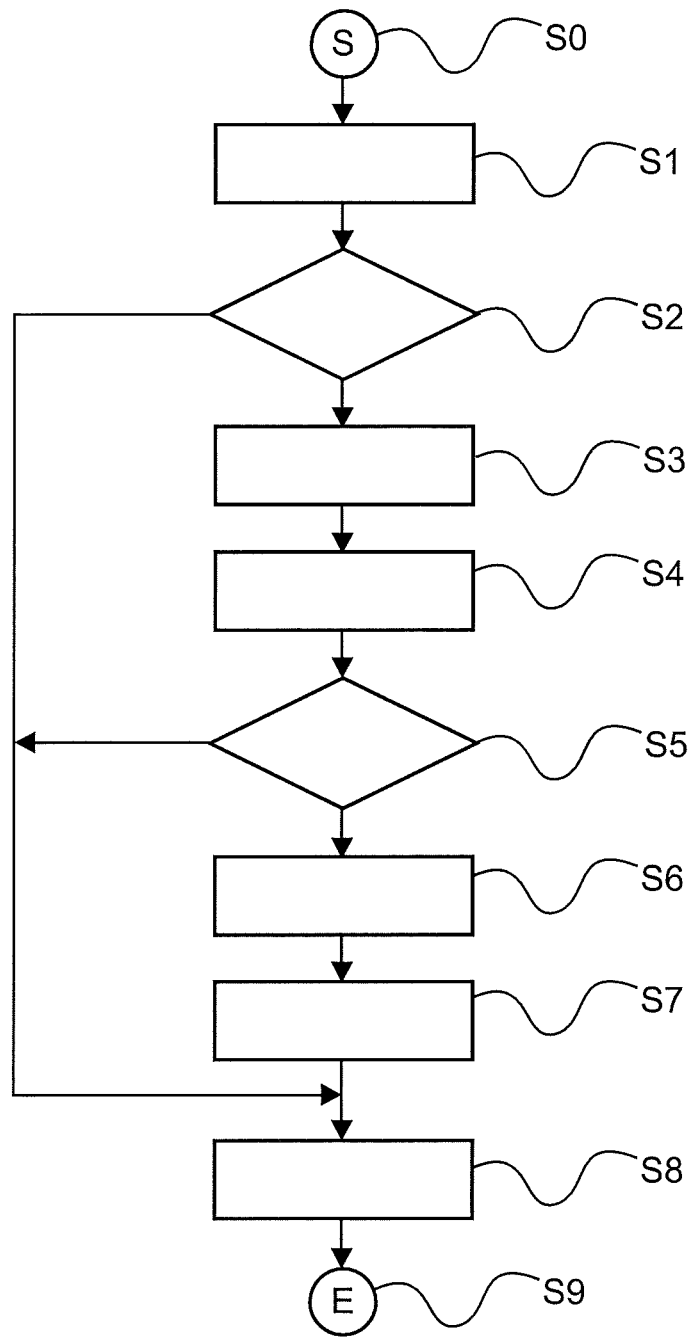
FIG. 6 shows a flowchart to illustrate steps of a method for operating a fill level measuring device according to an exemplary embodiment.

FIG. 6 shows a flowchart illustrating steps of a method for operating a fill level measuring device 105 according to an example. The fill level measuring device 105 can be one of the fill level measuring devices 105 described with reference to the preceding figures.

A measuring cycle starts in a starting state S0.

In step S1, a movement signal and/or a motion value B of the movement signal is first detected using the detector 220 and/or a movement sensor 222.

In step S2, the movement signal is used to check whether the fill level measuring device 105 is moving or immobile.

For example, the movement signal may be binary and a nonzero motion value B of the movement signal may indicate that the fill level measuring device 105 is moving. If this is the case, the radar module 204, the antenna 206, and/or the high-frequency unit 208 are to be deactivated at least temporarily so that no transmission signal can be emitted. In this case, the method leads to step S8.

Optionally, in step S8, a last determined measurement value and/or a measurement value stored in the fill level measuring device 105 can be made available externally as a current measurement value, for example, via the communication circuitry 218.

If, however, the check in step S2 shows that there is no movement of the fill level measuring device 105 and/or the fill level measuring device 105 is immobile, step S3 follows step S2, in which the geographic position P of the fill level measuring device 105 and/or a position signal correlating therewith is determined by means of the detector 220 and/or the position sensor 224.

In step S4, the position signal and/or the determined position P is compared with a database in order to determine whether the fill level measuring device 105 is located within a perimeter, an environment and/or a zone around a protected facility (e.g., a radio astronomy station).

In step S5, it is then checked whether the database comparison confirms the position within a protected environment. If this is the case, the radar module 204, the antenna 206, and/or the high-frequency circuitry 208 are to be at least temporarily deactivated so that no transmission signal can be emitted. The method thus leads directly to step S8.

Optionally, in step S8, a last determined measurement value and/or a measurement value stored in the fill level measuring device 105 can be made available externally as a current measurement value, for example via the communication circuitry 218.

If the test in step S5 shows that the fill level measuring device is outside the vicinity of a protected facility, a fill level measurement can be performed and the method can be continued in step S6, in which the radar module 204, the antenna 206, and/or the high-frequency circuitry 208 is activated, so that a transmission signal, for example, a transmission signal with a frequency of 6 GHz or higher, is radiated via the antenna 206.

In step S7, the received signal reflected from the medium is analyzed by the controller 214 and a measurement signal and/or measured value (or fill level value) correlating with the fill level is determined. Optionally, the determined measurement value can be stored and/or stored temporarily in the memory 219 of the fill level measuring device 105.

In step S8, the measurement value is made known via a communication device 218, preferably in wireless form, to a higher-level controller, a control station, a receiver, and/or a server.

The measurement cycle then ends with step S9.

In addition, it should be noted that "comprising" and "including" do not exclude any other elements or steps and the indefinite articles "one" or "one" do not exclude any multiplicity. It should also be noted that features or steps described with reference to any of the above application or embodiment examples may also be used in combination with other features or steps.

The invention claimed is:

1. A fill level measuring device for detecting a fill level of a medium, the fill level measuring device comprising:
   a radar module configured to emit a transmission signal and to receive a received signal reflected by the medium;
   a controller configured to detect, based on the received signal, a measurement signal correlating with the fill level; and
   a detector configured to detect a movement signal indicative of a movement of the fill level measuring device,
   wherein the controller comprises an activation circuitry configured to at least partially activate and/or deactivate the radar module depending on the movement signal, and
   wherein the activation circuitry of the controller is further configured to actuate the radar module on the basis of the movement signal, such that the radar module only transmits the transmission signal while the fill level measuring device does not move or is static.

2. The fill level measuring device of claim 1,
   wherein the activation circuitry is further configured to detect, based on the movement signal, whether the fill level measuring device is located in a perimeter of a protected facility, and
   wherein the activation circuitry is further configured to at least partially deactivate the radar module if the fill level measuring device is located in the perimeter of the protected facility.

3. The fill level measuring device of claim 2,
   wherein the detector is further configured to detect a position signal indicative of a geographic position of the fill level measuring device,
   wherein the position signal is representative of a current geographic position of the fill level measuring device and/or correlates with a current position of the fill level measuring device, and
   wherein the activation circuitry is further configured to detect, based on a comparison of the current position of the fill level measuring device with position data defining the perimeter of the protected facility, whether the fill level measuring device is located in the perimeter of the protected facility.

4. The fill level measuring device of claim 3,
   wherein the position data defining the perimeter of the protected facility is stored in a memory of the fill level measuring device, and/or
   wherein the fill level measuring device is configured to retrieve the position data defining the perimeter of the protected facility via remote querying.

5. The fill level measuring device of claim 3,
   wherein the detector further comprises at least one sensor configured to detect the position signal, and
   wherein the at least one sensor is selected from the group consisting of Doppler sensor, acceleration sensor, gyro sensor, vibration sensor, geomagnetic field sensor, and position sensor.

6. The fill level measuring device of claim 1,
   wherein the detector comprises at least one sensor configured to detect the movement signal, and
   wherein the at least one sensor is selected from the group consisting of Doppler sensor, acceleration sensor, gyro sensor, vibration sensor, geomagnetic field sensor, and position sensor.

7. The fill level measuring device of claim 1,
   wherein the detector is configured to detect a first position signal at a first time instant and a second position signal at a second time instant, which differs from the first time instant, and
   wherein the detector is further configured to detect the movement signal based on a comparison of the first position signal and the second position signal.

8. The fill level measuring device of claim 1, further comprising:
   a communication circuitry configured to transmit wireless and/or via a wireless network the measurement signal and/or a measurement value correlating with the measurement signal to a receiver.

9. The fill level measuring device of claim 8,
   wherein the detector is coupled with the communication circuitry, and
   wherein the detector is configured to detect the movement signal and/or the position signal based on the position data received via the communication circuitry.

10. The fill level measuring device of claim 1, wherein the detector is integrated in the controller.

11. The fill level measuring device of claim 1,
    wherein the radar module comprises a high frequency circuitry configured to generate the transmission signal and an antenna configured to transmit the transmission signal and to receive the received signal, and
    wherein the activation circuitry is further configured to activate and/or deactivate the high frequency circuitry and/or the antenna depending on the movement signal and/or on the position signal detected by the detector.

12. The fill level measuring device of claim 1,
    wherein the fill level measuring device further comprises a housing, which completely encloses the radar module, the controller, and the detector, and/or
    wherein the fill level measuring device is configured to be completely cable-free to an exterior of the fill level measuring device.

13. The fill level measuring device of claim 1, further comprising:
    an energy supply, which is arranged in a housing of the fill level measuring device and which is configured to supply the radar module, the controller, and the detector with electrical energy.

14. The fill level measuring device of claim 1, wherein the fill level measuring device is a limit level switch configured to detect a limit level of the medium.

15. A method for operating the fill level measuring device according to claim 1, the method comprising the steps of:
    detecting, by means of the detector of the fill level measuring device, the movement signal indicative of the movement of the fill level measuring device;
    activating and/or deactivating, by the controller of the fill level measuring device, at least a part of the radar module of the fill level measuring device depending on the detected movement signal; and actuating the radar module on the basis of the movement signal, such that the radar module only transmits the transmission signal while the fill level measuring device does not move or is static.

* * * * *